United States Patent
Kobayashi et al.

(10) Patent No.: US 9,854,195 B2
(45) Date of Patent: Dec. 26, 2017

(54) IMAGE CAPTURING APPARATUS, CONTROL METHOD FOR THE SAME, AND STORAGE MEDIUM

(71) Applicant: CANON KABUSHIKI KAISHA, Tokyo (JP)

(72) Inventors: Hirokazu Kobayashi, Tokyo (JP); Mie Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 18 days.

(21) Appl. No.: 15/004,340

(22) Filed: Jan. 22, 2016

(65) Prior Publication Data
US 2016/0219237 A1 Jul. 28, 2016

(30) Foreign Application Priority Data
Jan. 26, 2015 (JP) .................. 2015-012533

(51) Int. Cl.
| | |
|---|---|
| *H04N 5/378* | (2011.01) |
| *H04N 5/3745* | (2011.01) |
| *H04N 5/374* | (2011.01) |
| *H04N 5/363* | (2011.01) |
| *H04N 5/369* | (2011.01) |

(52) U.S. Cl.
CPC ............ *H04N 5/378* (2013.01); *H04N 5/363* (2013.01); *H04N 5/3696* (2013.01); *H04N 5/3742* (2013.01); *H04N 5/3745* (2013.01)

(58) Field of Classification Search
CPC ...... H04N 5/232; H04N 5/378; H04N 5/3745; H04N 5/3742; H04N 5/363
See application file for complete search history.

(56) References Cited

U.S. PATENT DOCUMENTS

| | | | | |
|---|---|---|---|---|
| 2001/0036361 A1* | 11/2001 | Suda | ...................... | G03B 13/32 396/111 |
| 2003/0010896 A1* | 1/2003 | Kaifu | ................... | H04N 3/1562 250/208.1 |
| 2004/0252215 A1* | 12/2004 | Mori | ................. | H01L 27/14609 348/308 |
| 2009/0021625 A1* | 1/2009 | Sowa | ..................... | H04N 3/155 348/308 |
| 2013/0002919 A1* | 1/2013 | Tajima | ............... | H04N 5/23212 348/311 |
| 2014/0285705 A1* | 9/2014 | Uchida | .............. | H04N 5/23212 348/345 |
| 2014/0375859 A1* | 12/2014 | Ono | .................. | H01L 27/14601 348/308 |

(Continued)

FOREIGN PATENT DOCUMENTS

JP 2013-090160 A 5/2013

*Primary Examiner* — Abdelaaziz Tissire
(74) *Attorney, Agent, or Firm* — Cowan, Liebowitz & Latman, P.C.

(57) ABSTRACT

An image capturing apparatus comprises a unit pixel including a plurality of light receiving elements, a plurality of column output lines provided, for each column, at a number greater than or equal to at least a number of the light receiving elements of each unit pixel, and a switching unit configured to switch between a first readout mode for reading out signals from the plurality of light receiving elements via respectively different column output lines and a second readout mode for reading out signals from the plurality of light receiving elements via the same column output line for each unit pixel.

13 Claims, 10 Drawing Sheets

(56) References Cited

U.S. PATENT DOCUMENTS

| | | | | |
|---|---|---|---|---|
| 2015/0029375 A1* | 1/2015 | Sugawa | ............... | H04N 5/3575 348/308 |
| 2015/0029376 A1* | 1/2015 | Sugawa | ................ | H04N 5/378 348/308 |
| 2015/0181140 A1* | 6/2015 | Onishi | ................... | H04N 5/361 348/243 |
| 2015/0215561 A1* | 7/2015 | Maehashi | ............ | H04N 5/3745 348/273 |
| 2015/0312461 A1* | 10/2015 | Kim | ................. | H01L 27/14609 348/308 |
| 2016/0198110 A1* | 7/2016 | Ikedo | .................... | H04N 5/378 348/231.99 |

* cited by examiner

IMAGE CAPTURING APPARATUS, CONTROL METHOD FOR THE SAME, AND STORAGE MEDIUM

BACKGROUND OF THE INVENTION

Field of the Invention

The present invention relates to an image capturing apparatus and a control method for the same.

Description of the Related Art

In recent years, major advances have been made toward improving the functionality of image capturing apparatuses such as digital cameras. Particularly in the field of solid-state image sensors, the obtainment of focus information by using a so-called on-imaging surface phase difference method has contributed to an increase in auto-focus (hereinafter "AF") speed. The following is a description of the typical methods of obtaining focus information by using phase difference detection. Specifically, light that has passed through a portion of a pupil of the imaging optical system is received by a first light receiving element and light that has passed through a pupil region excluding the portion of the pupil through which light is received by the first light receiving element is received by a second light receiving element, and an image shift amount of the two images is obtained by a correlation calculation or the like. The direction in which an amount by which the focusing lens is to be moved can be understood by using the image shift amount of the two images, and thus high-speed AF can be performed.

The on-imaging surface phase difference method is a method in which light receiving elements that divide the pupil of an imaging optical system and receive light, are arranged on an imaging surface on a solid-state image sensor that obtains captured images. Currently, two main types of pixel configuration are employed for the solid-state image sensor on which such an on-imaging surface phase difference method is realized. The first pixel configuration is a configuration in which a pixel that receives light that has passed through a portion of the pupil of the imaging optical system and a pixel that receives light that has passed through a pupil region excluding the portion of the pupil through which light is received by the first light receiving element are arranged in a specific pattern among image capturing pixels that receive light that has passed through the entire pupil region. Also, the second pixel configuration is a configuration in which N (N being an integer of two or more) light receiving elements that divide the pupil of the imaging optical system into N are arranged within one unit pixel.

The first pixel configuration allows for the pupil region through which light is received by a light shielding structure of pixels or the like to be defined and is comparatively easy to manufacture, but the configuration is arranged by replacing some of the image capturing pixels, and thus these pixels cannot be used as image capturing pixels. Thus, there is a need to interpolate the signals that are missing due to this arrangement from adjacent image capturing pixels.

On the other hand, the second pixel configuration is difficult to manufacture because the unit pixel is divided into a plurality of light receiving elements by element isolation or the like, but pixels with the same structure constitute the image capturing pixels, and therefore non-uniformity from pixel to pixel does not occur. Also, the original captured image can be obtained by adding or averaging the signals from the divided light receiving elements. However, the number of light receiving elements is N times the number of image capturing pixels, and therefore it takes time to independently read out all of the signals from the light receiving elements.

In contrast to this, the technology described in Japanese Patent Laid-Open No. 2013-090160 proposes to resolve this issue by employing a configuration that includes a plurality of vertical output lines. Japanese Patent Laid-Open No. 2013-090160 discloses a configuration in which, in reading out signals from the plurality of light receiving elements included in the unit pixel via a corresponding plurality of vertical output lines, signals are read out via the same horizontal output line, in the case where the signals of the light receiving elements constituting one unit pixel are read out collectively.

However, as an extension of the technology in Japanese Patent Laid-Open No. 2013-090160, when reading out the signals from the divided light receiving elements on each of the plurality of vertical output lines provided for each unit pixel, only one of the signals from the light receiving elements can be readout via the vertical output line. For this reason, the signals from the pixels in a plurality of rows cannot be read out simultaneously, and shortening of the readout time is not achieved.

SUMMARY OF THE INVENTION

The present invention has been made in light of the above issues, and shortening of readout time is achieved in a solid-state image sensor constituted by a unit pixel configuration including light receiving elements that divide the pupil of the imaging optical system and receive light.

According to a first aspect of the present invention, there is provided an image capturing apparatus comprising: a unit pixel including a plurality of light receiving elements; a plurality of column output lines provided, for each column, at a number greater than or equal to at least a number of the light receiving elements of each unit pixel; and a switching unit configured to switch between a first readout mode for reading out signals from the plurality of light receiving elements via respectively different column output lines and a second readout mode for reading out signals from the plurality of light receiving elements via the same column output line for each unit pixel.

According to a second aspect of the present invention, there is provided a control method of an image capturing apparatus that includes a unit pixel having a plurality of light receiving elements and a plurality of column output lines provided, for each column, at a number greater than or equal to at least a number of the light receiving elements of each unit pixel, comprising: switching between a first readout mode for reading out signals from the plurality of light receiving elements via respectively different column output lines and a second readout mode for reading out signals from the plurality of light receiving elements via the same column output line for each unit pixel.

According to a third aspect of the present invention, there is provided a computer-readable storage medium storing a program for causing a computer to execute a control method of an image capturing apparatus that includes a unit pixel having a plurality of light receiving elements and a plurality of column output lines provided, for each column, at a number greater than or equal to at least a number of the light receiving elements of each unit pixel, the control method switching between a first readout mode for reading out signals from the plurality of light receiving elements via respectively different column output lines and a second readout mode for reading out signals from the plurality of light receiving elements via the same column output line for each unit pixel.

Further features of the present invention will become apparent from the following description of exemplary embodiments with reference to the attached drawings.

DESCRIPTION OF THE EMBODIMENTS

Figure 1:
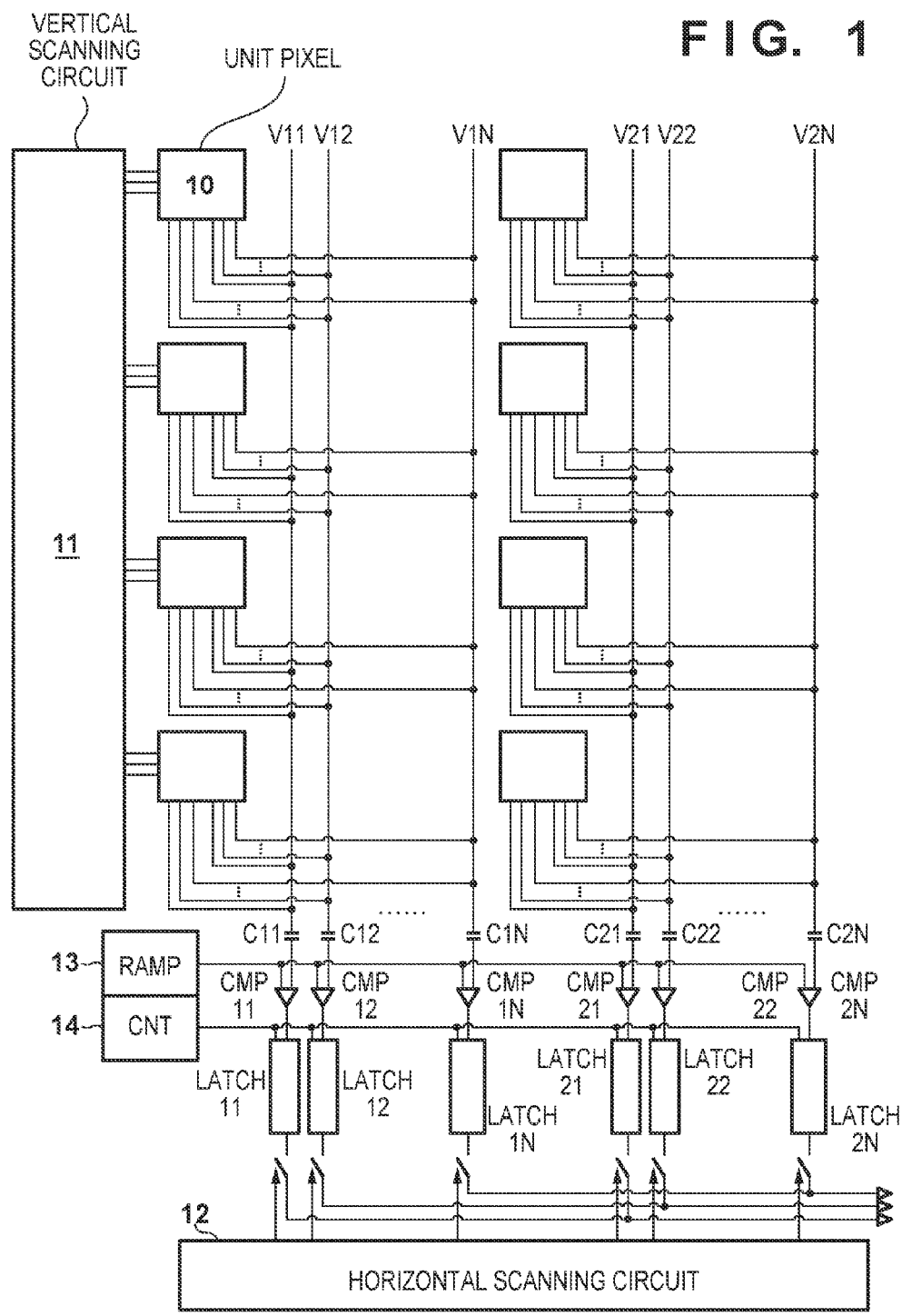
FIG. 1 is a block diagram showing a configuration of a solid-state image sensor according to an embodiment of the present invention.

The following describes the embodiments of the present invention in detail with reference to the accompanying drawings. FIG. 1 is a block diagram showing the configuration of a solid-state image sensor according to an embodiment of the present invention. In FIG. 1, unit pixels 10 are two dimensionally arranged on an image capturing surface in a row direction and a column direction. A detailed configuration of the unit pixel 10 will be described below. A vertical scanning circuit 11 provides a predetermined driving signal to the unit pixels 10 in row order, for example. The types of driving signals that are to be provided and the timing thereof are described below.

A horizontal scanning circuit 12 selects, in row order, a latch to which pixel signals of a row driven by the vertical scanning circuit 11 are stored, and causes the stored pixel signals to be output from a row output line (a horizontal output line). A plurality of column output lines V11 to V1N and V21 to V2N are respectively arranged in the first and second pixel columns. Here, N is an integer of two or more and is a number that is equal to or greater than the number of light receiving elements provided in one unit pixel. The pixel signals of the unit pixels 10 can be selectively output from an $M^{th}$ (1<=M<=N) column output line among the provided plurality of column output lines. A detailed configuration for this purpose is included in the configuration of the unit pixels 10, and therefore is described below. Note that FIG. 1 shows that N column output lines are respectively arranged in the first and second pixel columns, and N column output lines are also similarly arranged in each pixel column from the third pixel column onward.

Clamp capacitors C11 to C1N and C21 to C2N clamp the output pixel signals on the column output lines V11 to V1N and V21 to V2N, respectively. Pixel signals respectively clamped by the clamp capacitors C11 to C1N and C21 to C2N are one of the inputs to comparators CMP11 to CMP1N and CMP21 to CMP2N.

A ramp signal generator ramp 13 generates a ramp signal that is to be input in common as the other input of the comparators CMP11 to CMP1N and CMP21 to CMP2N. The comparators CMP11 to CMP1N and CMP21 to CMP2N compare the ramp signal and the clamped pixel signal, and change the output potential according to the result of the comparison. Also, the ramp signal is a signal whose potential changes proportionally to the amount of time that has elapsed since the signal was generated.

A counter CNT 14 is connected in common to the outputs of the comparators CMP11 to CMP1N and CMP21 to CMP2N, and the counter CNT 14 counts the amount of time that elapses from when the count value is reset to the point when the output potential of the comparators CMP11 to CMP1N and CMP21 to CMP2N changes. Latch 11 to latch 1N and latch 21 to latch 2N are provided respectively on the column output lines V11 to V1N and V21 to V2N, and store the digital values resulting from the counting. The horizontal scanning circuit 12 successively transmits these digital values in the column direction. One feature of the present embodiment is that signals corresponding to the number of rows that can be stored in a latch are transferred within one signal horizontal scanning period.

First Embodiment

The present embodiment describes, as the simplest system, a configuration and a driving method of a unit pixel in a case where two (namely, N=2) light receiving elements that divide the pupil of the imaging optical system in the unit pixel and receive light are provided.

Figure 2:
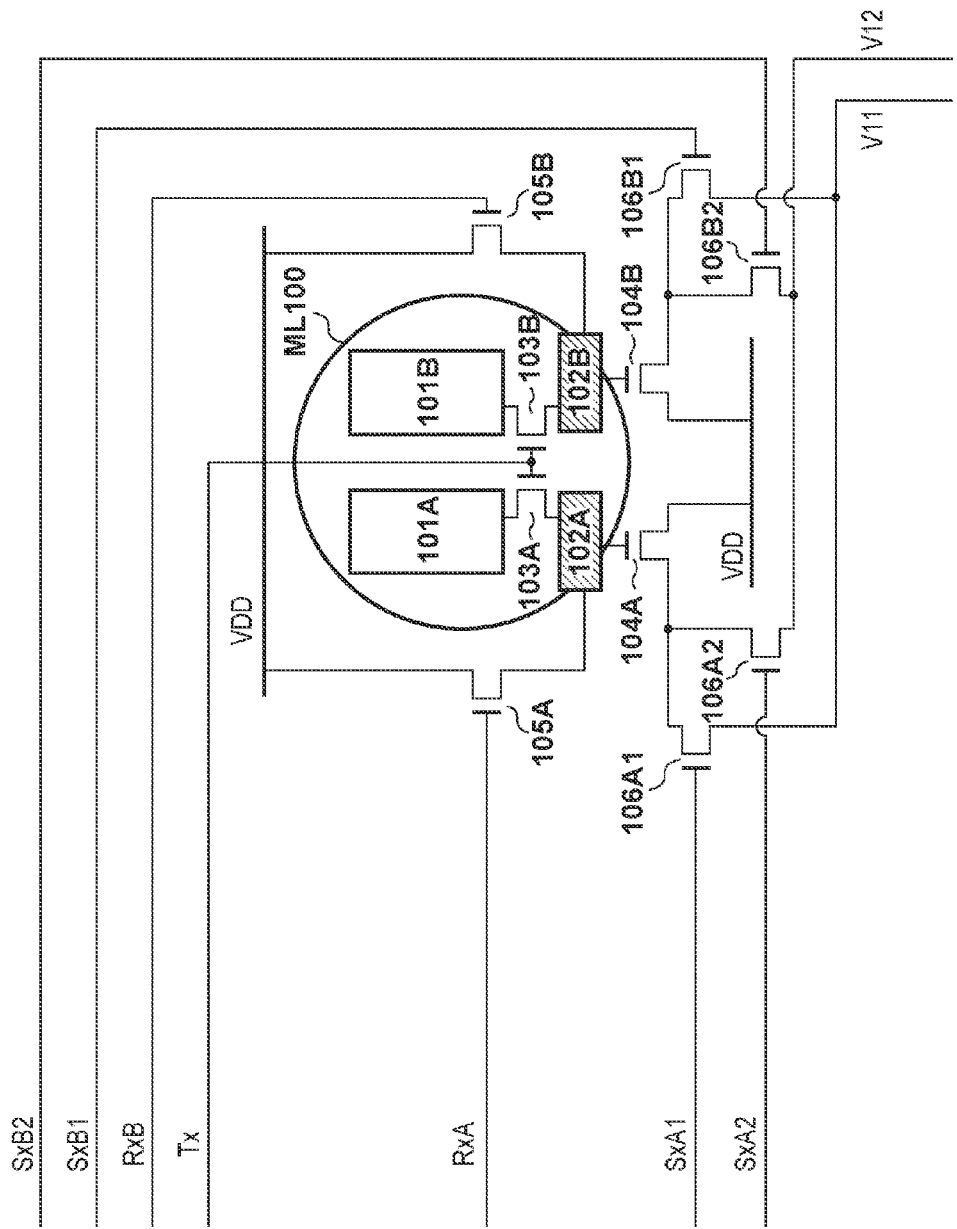
FIG. 2 is an equivalent circuit diagram showing a configuration of a unit pixel of a solid-state image sensor according to a first embodiment.

FIG. 2 is one example of an equivalent circuit diagram that shows the configuration of the unit pixels 10 in the solid-state image sensor. In FIG. 2, two light receiving elements 101A and 101B can divide the pupil of the imaging optical system, which is not shown in the drawing, into two and perform photoelectronic conversion by being arranged at the focal position of a micro lens (hereinafter "ML") 100. Charge voltage conversion units 102A and 102B are floating diffusion nodes and have a charge storage function. The charge voltage conversion units 102A and 102B are respectively connected to light receiving elements 101A and 101B via transfer transistors 103A and 103B, and the charges of the light receiving elements 101A and 101B are transferred due to the potential of the control line Tx of these transistors attaining a high level.

Also, the charge voltage conversion units 102A and 102B are connected to a power source potential VDD via reset transistors 105A and 105B. Then, the stored charges can be reset by the charge voltage conversion units 102A and 102B due to the potential of control lines RxA and RxB of the reset transistors 105A and 105B attaining a high level.

The gates of amplification transistors 104A and 104B are respectively connected to the charge voltage conversion units 102A and 102B. Also, the amplification transistors 104A and 104B are respectively connected to the current sources on the column output lines V11 and V12 via selection transistors 106A1, 106A2, 106B1, and 106B2, and constitute a source follower circuit.

The selection transistor 106A1 transmits the signal from the light receiving element 101A to the column output line V11, and the selection transistor 106A2 transmits the signal from the light receiving element 101A to the column output line V12. Similarly, the selection transistor 106B1 transmits the signal from the light receiving element 101B to the column output line V11, and the selection transistor 106B2 transmits the signal from the light receiving element 101B to the column output line V12. These selection transistors transmit signals from the light receiving elements when the potential of control lines SxA1, SxA2, SxB1, and SxB2 attains a high level.

Figure 3:
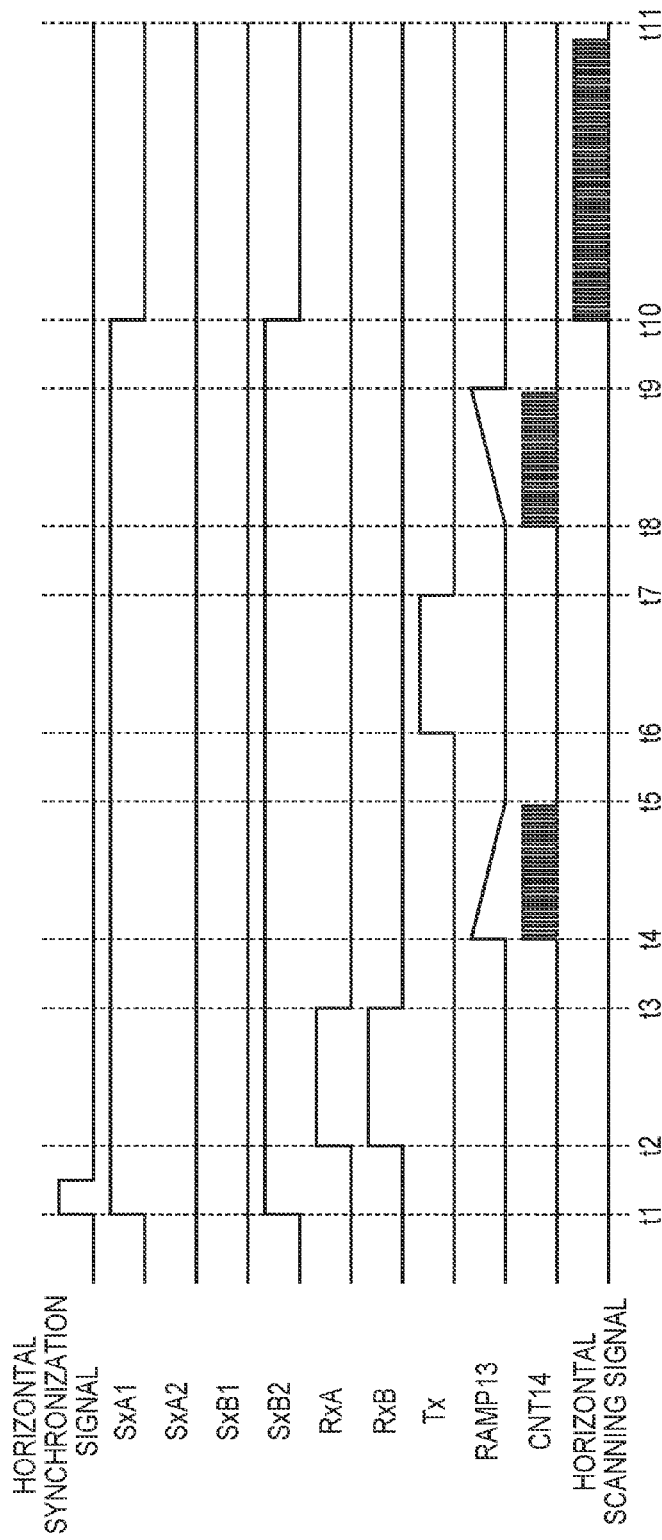
FIG. 3 is a timing chart showing a first readout mode according to the first embodiment.

Next, the driving method of the solid-state image sensor of the present embodiment will be described using FIGS. 3 and 4. FIG. 3 is a timing chart that shows a first readout mode for one horizontal scanning period.

The solid-state image sensor of the present embodiment can transfer as much data as can be stored in the latches 11 and 12 and the latches 21 and 22 in one horizontal scanning period. For this reason, in the first readout mode, the signal from the light receiving element 101A is transmitted to the column output line V11 and the signal from the light receiving element 101B is transmitted to the column output line V12. Accordingly, a signal of a group of light receiving elements denoted as signal [A] and a signal of a group of light receiving elements denoted as signal [B] can be transmitted simultaneously by being output to different column output lines.

At time t1 in FIG. 3, the potential of the control lines SxA1 and SxB2 of the selection transistors 106A1 and 106B2 rises along with the rise of the horizontal synchronization signal, and maintains a high level until time t10 is reached. On the other hand, the potential of the control lines SxA2 and SxB1 of the selection transistors 106A2 and 106B1 maintains a low level.

From time t2 to time t3, the potential of the control lines RxA and RxB of the reset transistors 105A and 105B attains a high level, and the charge voltage conversion units 102A and 102B are reset to the power source potential VDD.

During the period from time t4 to time t5, the potential (reset potential) of the charge voltage conversion units 102A and 102B with respect to which the above described reset was released is compared to the ramp signal from the ramp signal generator RAMP 13. Then, the reset potential of the charge voltage conversion units and the potential of the ramp signal are down-counted by the counter CNT 14 until they are reversed. In other words, the potential of the column output line V11 to which the reset signal of the light receiving element 101A (N signal) was transmitted and the potential of the column output line V12 to which the reset signal of the light receiving element 101B (N signal) was transmitted undergo AD conversion, and are temporarily stored in the latches 11 and 12.

Next, during the period from time t6 to time t7, the potential of the control line Tx of the transfer transistors 103A and 103B attains a high level, and the signal charges of the light receiving elements 101A and 101B are transferred to the charge voltage conversion units 102A and 102B.

During the period from time t8 to time t9, the potential of the charge voltage conversion units 102A and 102B to which the above-described signal charges were transmitted is compared to the ramp signal from the ramp signal generator RAMP 13. Then, the pre-transfer digital values of the signal charges previously temporarily stored to the latches 11 and 12 are up-counted as a start point by the counter CNT 14, and the potentials of the charge voltage conversion units are converted into digital values and are again stored in the latches 11 and 12. The digital values stored in the latches 11 and 12 are down-counted digital values of those previously temporarily stored in the latches, and thus it can be comprehended that a digital value that corresponds to a light signal charge is output.

At time t10, the two selection control lines SxA1 and SxB2 become low and their selection is released. During the period from time t10 to time t11, the horizontal scanning circuit 12 generates a horizontal scanning signal, and sequentially transfers the digital values stored in the latches 11 and 12 in the column direction.

Figure 4:
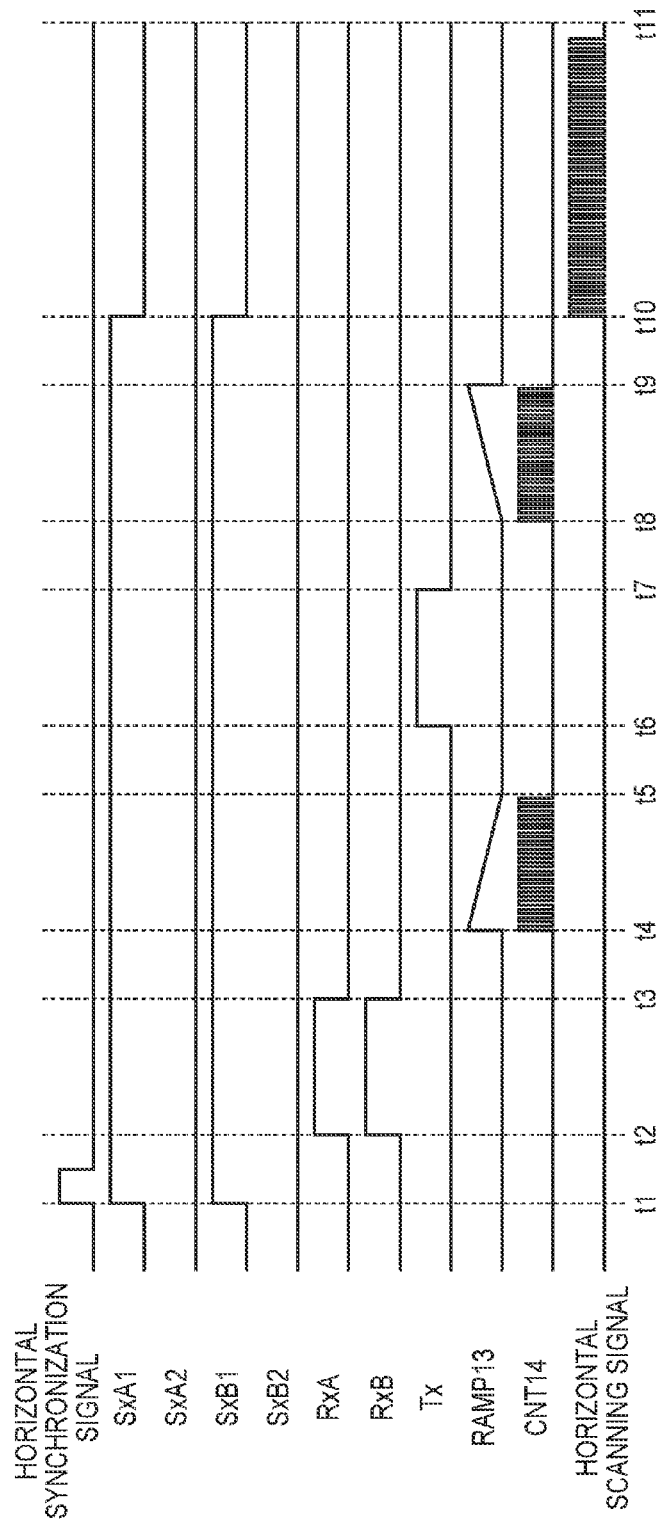
FIG. 4 is a timing chart showing a second readout mode according to the first embodiment.

On the other hand, FIG. 4 is a timing chart that shows the second readout mode for one horizontal scanning period. In the second readout mode, the signal from the light receiving element 101A and the signal from the light receiving element 101B are transmitted to the same column output line V11, and the output from each column output line is averaged. Accordingly, the column output line V12 becomes surplus, and therefore control is performed such that the signals of the light receiving element 101A and the light receiving element 101B are transmitted from a different readout row. Specifically, it is possible to simultaneously read out two rows worth of pixel signals.

FIG. 4 is different from FIG. 3 in that from time t1 to time t10 the potential of the selection control line SxB2 does not attain a high level, but rather the potential of the selection control line SxB1 attains a high level. Accordingly, during this period, the two amplification transistors 104A and 104B enter a state in which their sources are both connected to the same column output line V11, and therefore a potential obtained by averaging of potentials that correspond to the signal charges of the light receiving elements 101A and 101B is output.

Simultaneous readout from a different row can be performed on the surplus column output line V12. Specifically, regarding the different row with respect to which the two rows are read out simultaneously, the potential of the selection control lines SxA2 and SxB2 are set to be high from time t1 to time t10, and the potential of the selection control lines SxA1 and SxB1 are set to be low. Accordingly, during this period, the two amplification transistors 104A and 104B enter a state in which their sources are both connected to the same column output line V12, and therefore a potential obtained by averaging the potentials corresponding to the signal charges of the light receiving elements 101A and 101B is output. The solid-state image sensor of the present embodiment includes two or more readout modes.

The switching method for these two readout modes is described below.

Figure 5:
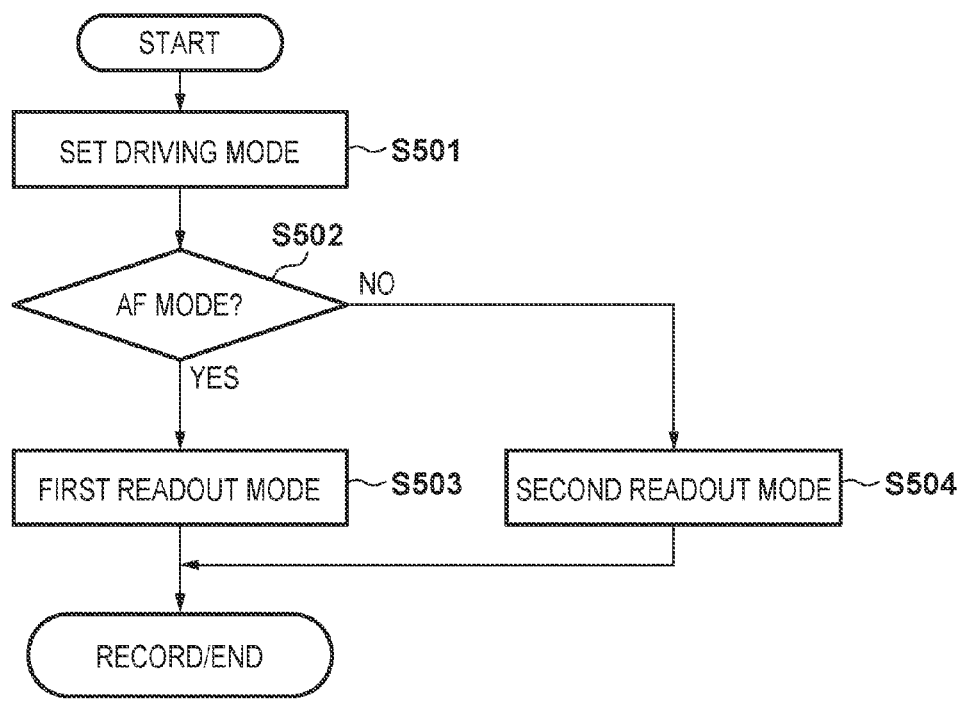
FIG. 5 is a flowchart showing a readout mode selection method according to the first embodiment.

FIG. 5 is a flowchart that illustrates the method for selecting which of the two readout modes of the present embodiment is to be applied.

In step S501, the solid-state image sensor is set to a driving mode. In step S502, it is determined whether or not the operation mode is the AF mode (an operation mode for obtaining the focus information of the imaging optical system). If the operation mode is the AF mode, the procedure moves to step S503, and the first readout mode is applied in which the potential of the selection control lines SxA1 and SxB2 is set to be high, and the signals from the light receiving element 101A and the light receiving element 101B are independently read out. The AF mode referred to here includes an operation mode, which is also known as live view for example, in which focusing is performed while monitoring the angle of view at which image capturing is to be performed with a display apparatus or the like. Accordingly, focus information regarding image capturing can be obtained without providing a dedicated AF sensor.

In step S502, if it is determined that the operation mode is not the AF mode, the procedure moves to step S504, the second readout mode is applied, the selection control lines required for two-row simultaneous readout are set, and the rows are read out. If the operation mode is not the AF mode, it may be an operation mode for performing still image capture or the like, for example.

Note that an AF function that is based on focus information obtained by the on-imaging surface phase difference method is also an effective means of maintaining the image quality while capturing a moving image. For this reason, the AF mode of the present embodiment is widely used to maintain the quality of moving images captured in such a manner.

Second Embodiment

In the present embodiment, the case in which the first readout mode and the second readout mode are applied to each region of the solid-state image sensor will be described.

Figure 6:
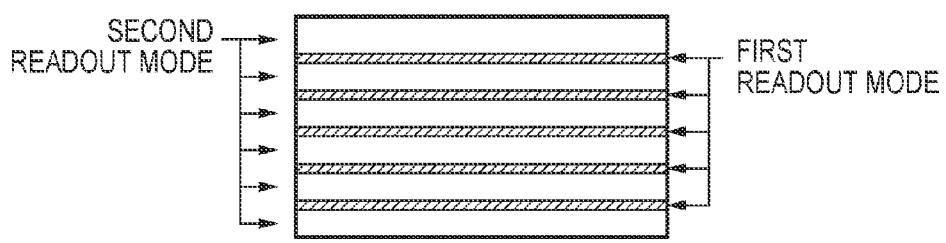
FIG. 6 is a diagram showing a pixel arrangement of a solid-state image sensor that executes a first readout mode and a second readout mode according to a second embodiment.

FIG. 6 is a diagram showing the pixel arrangement of a solid-state image sensor that executes the first readout mode and the second readout mode. The reasoning for independently reading out the signals from the light receiving elements that divide the pupil of the imaging optical system in the first readout mode is to obtain focus information by the on-imaging surface phase difference method. If focus information is obtained in such a manner, it is sufficient to independently readout some of the rows in a region that is to be the focus detection region from the solid-state image sensor. Thus, the obtainment of focus information by the on-imaging surface phase difference method and the shortening of the readout time can both be achieved by providing an area in which the first readout mode is applied to some of the rows while performing two-row simultaneous readout in which two rows worth of signals of unit pixels are read out simultaneously in the second readout mode.

Figure 7:
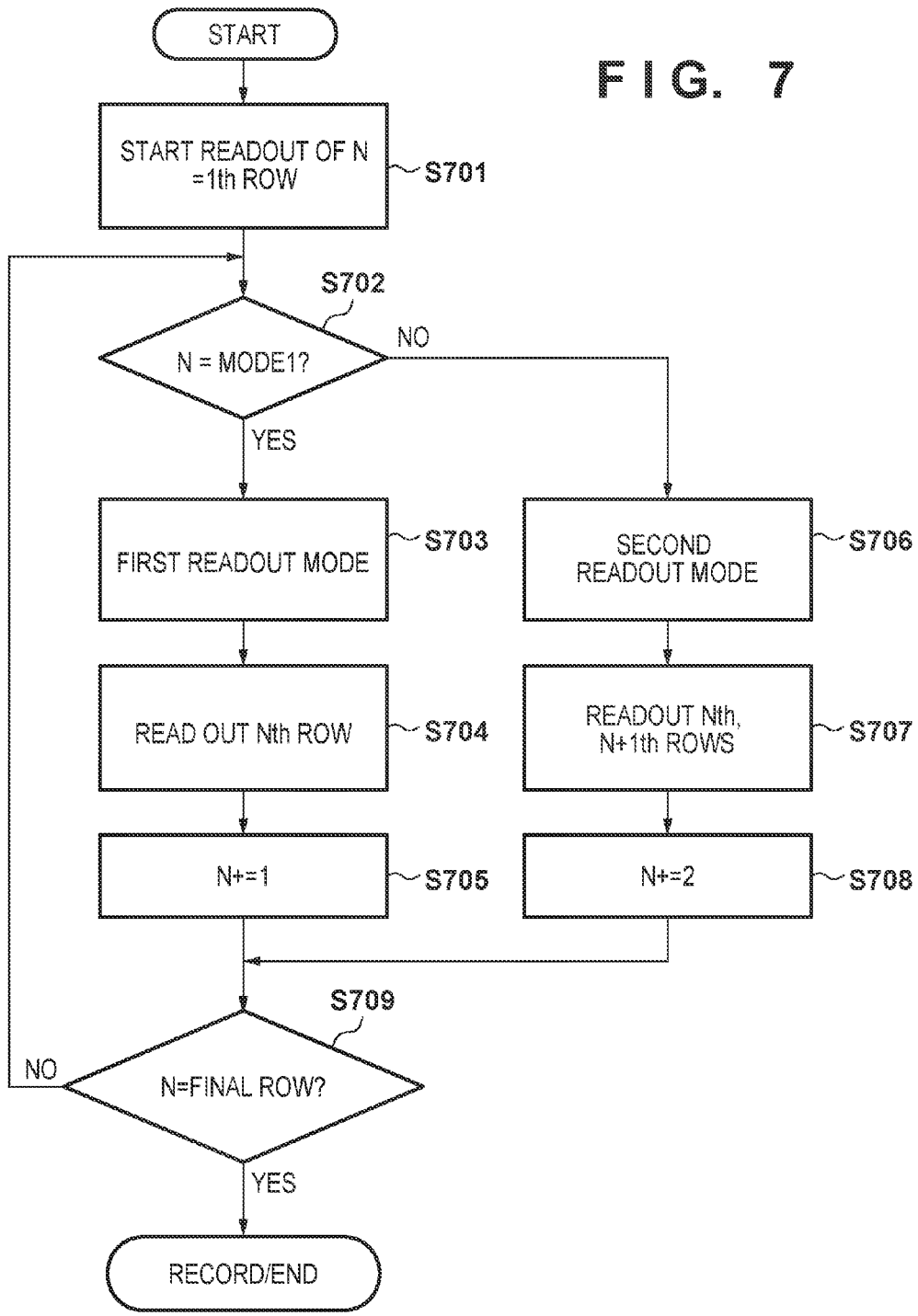
FIG. 7 is a flowchart showing a driving method of the solid-state image sensor according to the second embodiment.

FIG. 7 is a flowchart illustrating the method of selecting one of the two readout modes for each row starting from the readout row N=1$^{th}$ row (step S701). In step S702, it is determined whether or not the N$^{th}$ row is a row to which the first readout mode is to be applied. If it is determined that the first readout mode is to be applied, the procedure moves to step S703, the first readout mode is applied, the potential of the selection control lines SxA1 and SxB2 is set to a high level, the procedure moves to step S704, and the row is read out.

In step S702, if it is determined that the N$^{th}$ row is a row to which the second readout mode is to be applied, the procedure moves to step S706, the second readout mode is applied, the selection control lines required for two-row simultaneous readout are set, the procedure moves to step S707, and the N$^{th}$ row and the N+1$^{th}$ row are read out.

In step S705 and step S708, N is incremented by the number of rows that were read out, after which the procedure moves to step S709. Specifically, in step S705, N is incremented by one row, and in step S708, N is incremented by two rows. The procedure moves to step S709 and it is determined whether or not N is the final row. If N is not the final row, the procedure returns to step S702 and the same processes are continued. If N is the final row, the image is recorded and reading out is ended.

Third Embodiment

Figure 8:
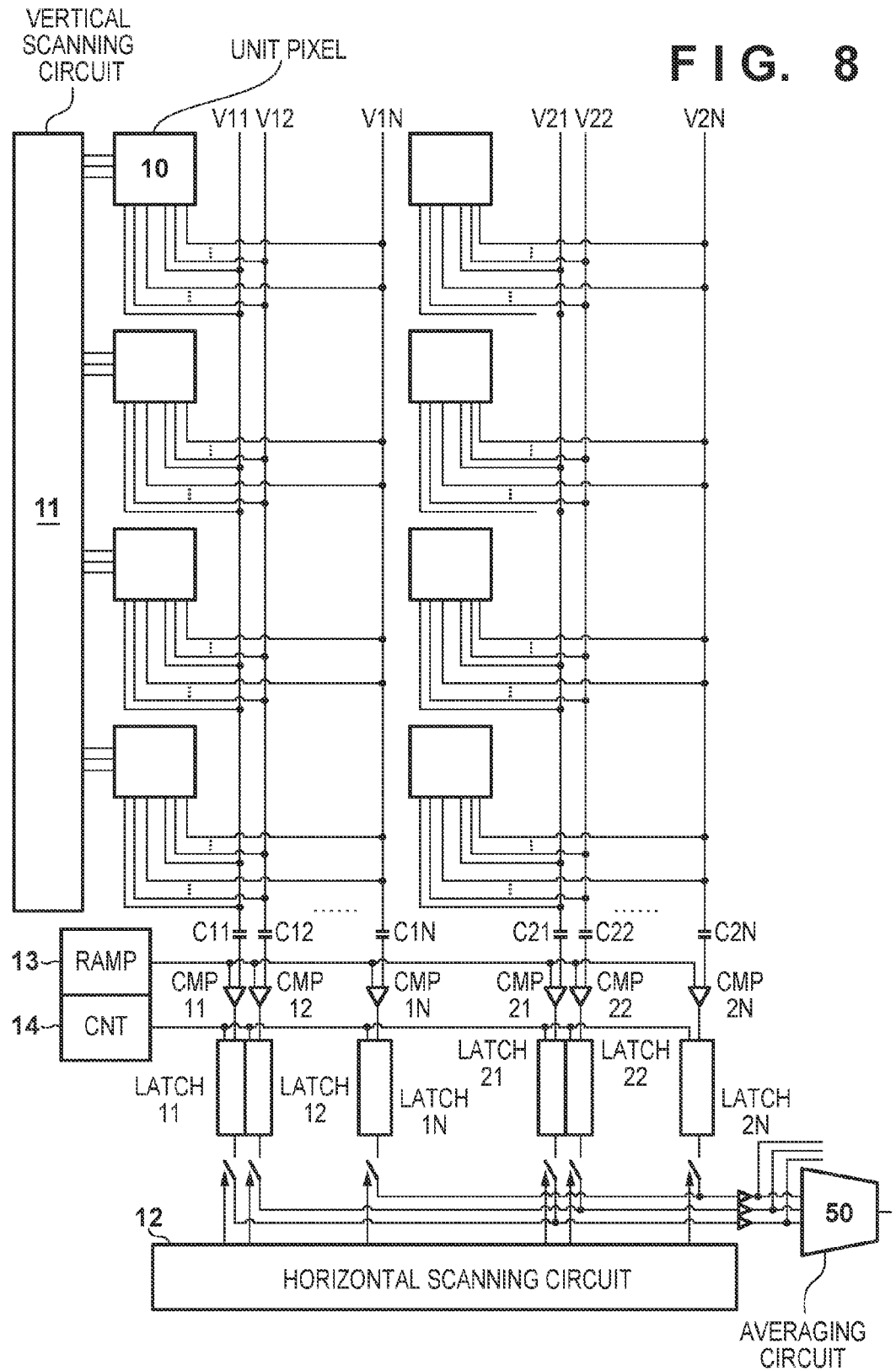
FIG. 8 is a block diagram showing a configuration of a solid-state image sensor according to a third embodiment of the present invention.

In the case where the first readout mode is executed in the first and second embodiments, the signals from the light receiving elements 101A and 101B are read out independently, although there is a need to average the signals from the two light receiving elements in order to readout these signals as a captured image. Thus, in the present embodiment, a circuit that averages the signals from the light receiving elements 101A and 101B is provided in the solid-state image sensor. FIG. 8 shows the configuration of such a solid-state image sensor. Also, obtainment of the captured image and control that allows output of focus information obtained by the on-imaging surface phase difference method are described using the flow chart shown in FIG. 9. FIG. 8 is different from FIG. 1, which shows the first embodiment, in that an averaging circuit 50 and a by-pass route are provided.

Figure 9:
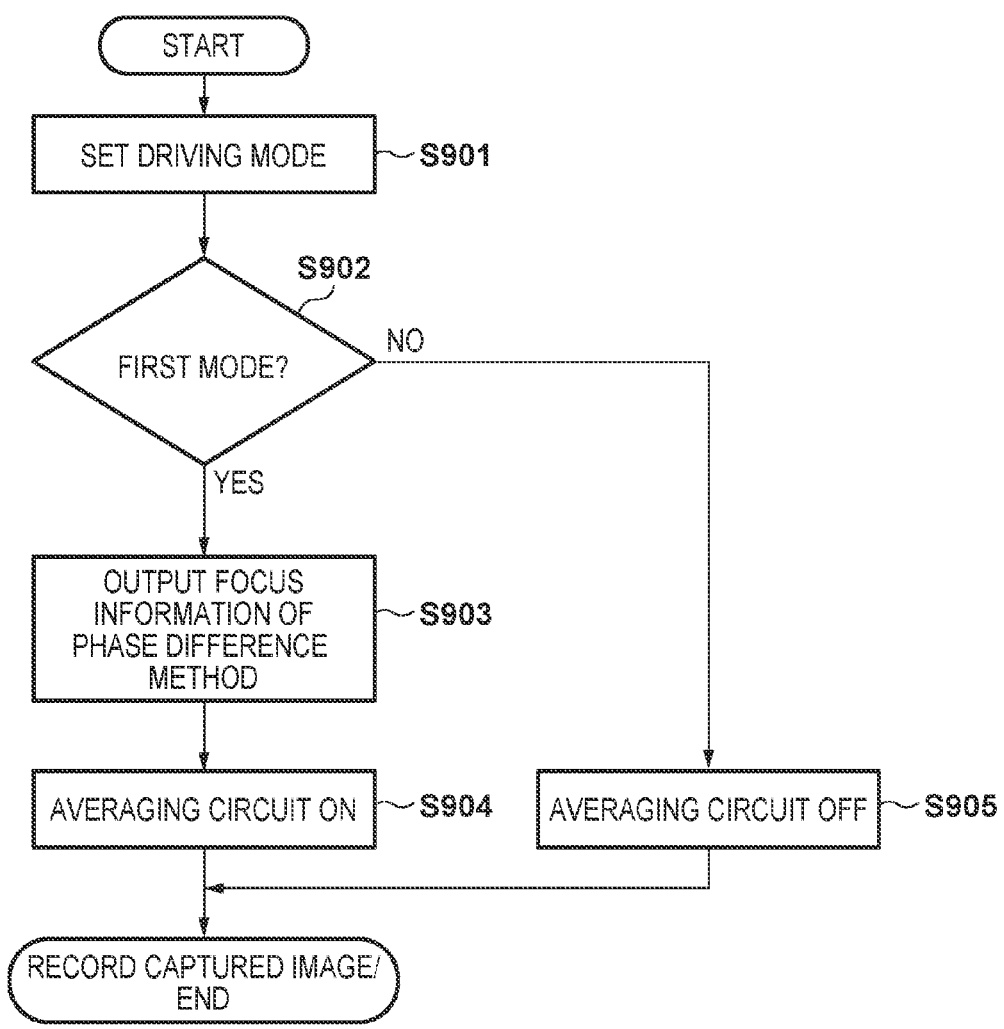
FIG. 9 is a flowchart showing a driving method of the solid-state image sensor according to the third embodiment.

In FIG. 9, the first driving mode is set in step S901. In step S902, it is determined whether or not the set driving mode is the first readout mode. If it is determined that the driving mode is the first readout mode, the procedure moves to step S903, the signals from the light receiving elements 101A and 101B are read out independently, and focus information obtained with a phase difference method is output. On the other hand, in step S904, the averaging circuit 50 is turned ON and outputs the averaged signal of the signals from the light receiving elements 101A and 101B.

In step S902, if it is determined that the set driving mode is the second readout mode, the procedure moves to step S905, and the averaging circuit 50 remains OFF. The signals read out in the first readout mode are composited, or all of the signals read out in the second readout mode are output and recorded as the captured image, and the process is ended.

Fourth Embodiment

In the present embodiment, as a third readout mode, the potential that corresponds to the combined signal charge from the light receiving elements 101A and 101B is read out by short circuiting the charge voltage conversion unit 102A and the charge voltage conversion unit 102B.

Figure 10:
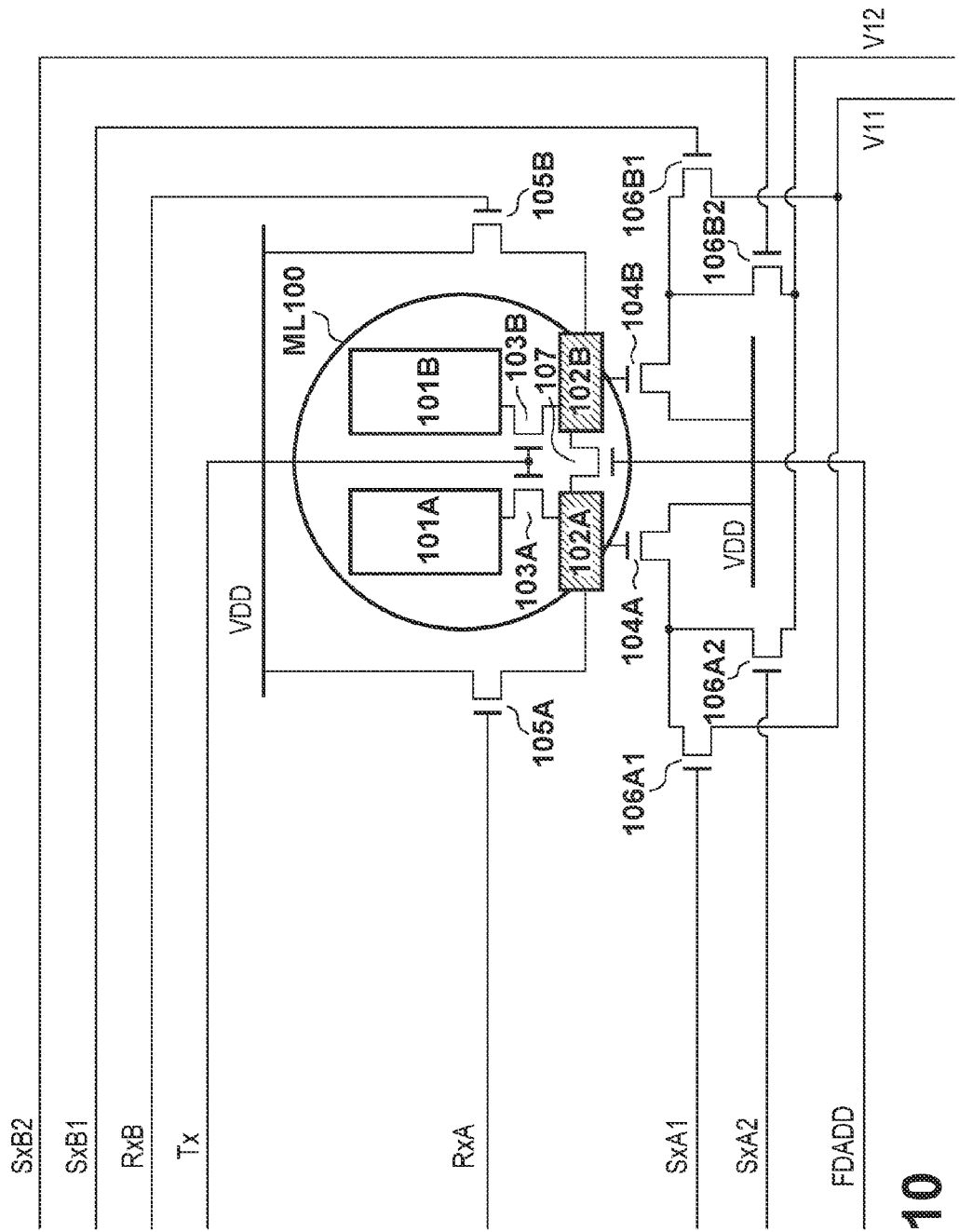
FIG. 10 is an equivalent circuit diagram showing a configuration of a unit pixel of a solid-state image sensor according to a fourth embodiment.

FIG. 10 shows the configuration of the unit pixels 10 of the solid-state image sensor applicable to the present embodiment. FIG. 10 is different from FIG. 2 in that an addition transistor 107 that can short circuit the charge voltage conversion unit 102A and the charge voltage conversion unit 102B is provided connected to the gate of a control line FDADD.

Figure 11:
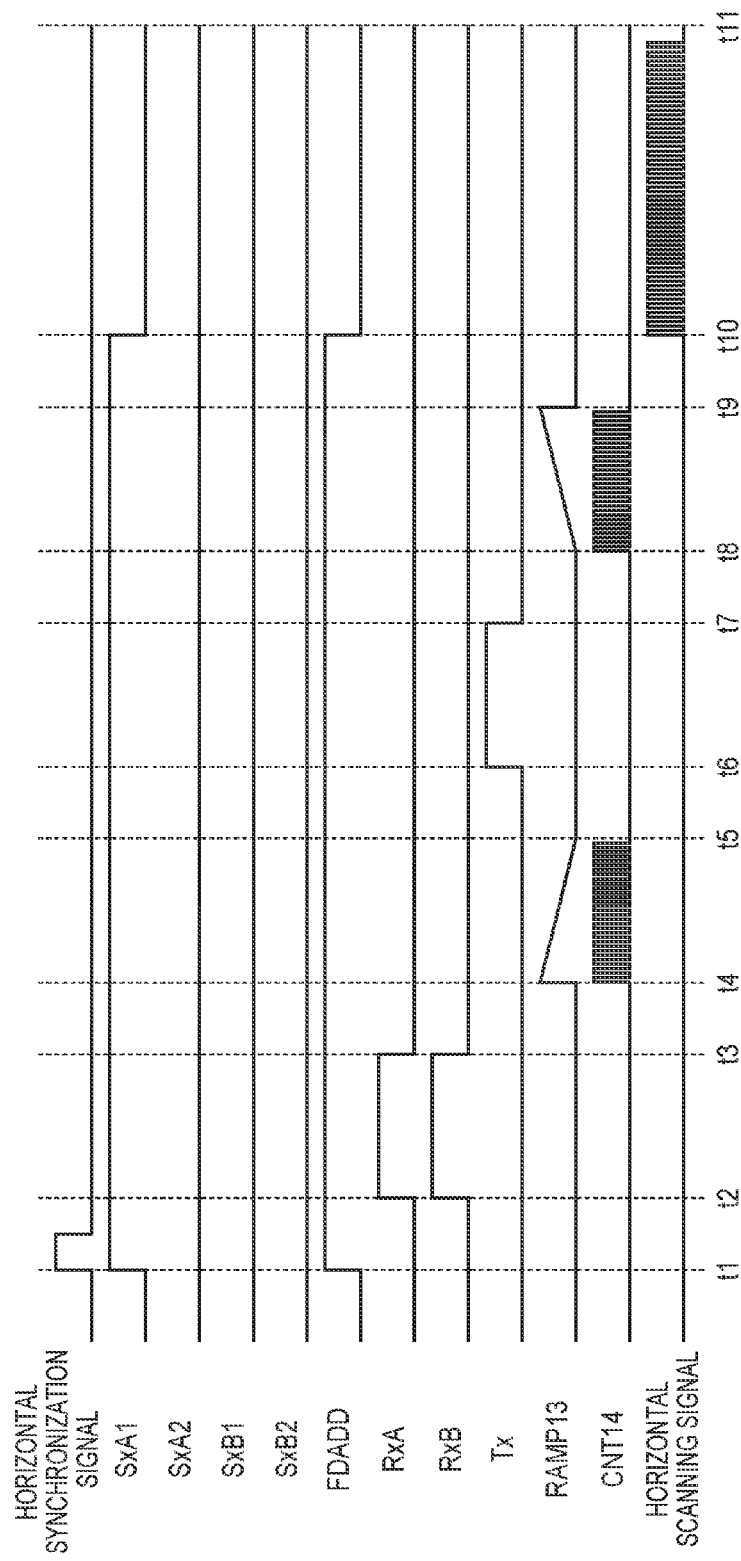
FIG. 11 is a timing chart showing a second readout mode according to the fourth embodiment.

FIG. 11 is a timing chart that shows the driving method that executes the third readout mode according to the present embodiment. FIG. 11 is different from FIG. 4 in that the potential of the selection control line SxB1 maintains a low level, and in that the potential of the FDADD maintains a high level from time t1 to time 10. The addition transistor 107 is turned ON by the potential of the FDADD attaining a high level, the signal charge of the light receiving element 101A and the signal charge of the light receiving element 101B are combined by short circuiting the charge voltage conversion unit 102A and the charge voltage conversion unit 102B before and after transfer of the signal charges, and the potentials corresponding to the combined signal charge can be read out on the column output lines V11 and V21. Note that the potential of the selection control line SxB1 may be set to high instead of that of the selection control line SxA1.

In the third readout mode shown in the present embodiment, a charge conversion gain is proportionate to the reciprocal of the composited capacitance of the charge voltage conversion unit 102A and the charge voltage conversion unit 102B, and therefore is lower than that of the second readout mode shown in the first embodiment. On the other hand, it is known that, in the second readout mode shown in the first embodiment, the potential that appears on the column output lines V11 and V21 shifts from the arithmetically averaged potential as the difference between the potentials of the light receiving element 101A and the light receiving element 102B increases. Thus, conceivable methods include using the third readout mode shown in the present embodiment used with low ISO sensitivity settings in which a large amount of the signal charge is generated, and using the second readout mode shown in the first embodiment with high ISO sensitivity settings in which a small amount of signal charge is generated.

Note that the above embodiments were described, taking a solid-state image sensor that includes light receiving elements that divide the pupil of the imaging optical system into two and receive light as an example. However, as shown in FIG. 1 in which there are N vertical output lines, the present invention can be applied to a solid-state image sensor that includes light receiving elements that divide the pupil of the imaging optical system by N and receive light.

As described above, according to the above embodiments, signals from each light receiving element are independently read out in a driving mode or a region that requires the obtainment of focus information by using the on-imaging surface phase difference method. Also, an averaged signal of the signals from the light receiving elements for each unit pixel is output in a driving mode or a region that does not require focus information. Therefore, by being able to simultaneously readout a plurality of rows by utilizing a plurality of vertical output lines the readout time can be shortened.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-012533, filed Jan. 26, 2015 which is hereby incorporated by reference herein in its entirety.

What is claimed is:

1. An image capturing apparatus comprising:
   a unit pixel including a plurality of light receiving elements;
   a plurality of column output lines provided, for each column, at a number greater than or equal to at least a number of the light receiving elements of each unit pixel; and
   a processor or a circuit that performs the functions of a switching unit that switches between a first readout mode for reading out signals from the plurality of light receiving elements via respectively different column output lines and a second readout mode for reading out signals from the plurality of light receiving elements via the same column output line for each unit pixel,
   wherein the switching unit switches between the first readout mode and the second readout mode on a row-by-row basis in each region of one or more unit pixels.

2. The image capturing apparatus according to claim 1, wherein the plurality of light receiving elements of each unit pixel divides a pupil of an imaging optical system.

3. The image capturing apparatus according to claim 1, further comprising:
   a selection circuit that selects column output lines to which the signals from the plurality of light receiving elements are to be output.

4. The image capturing apparatus according to claim 1, further comprising:
   a combining circuit that combines signal charges from the plurality of light receiving elements for each unit pixel.

5. The image capturing apparatus according to claim 4, further comprising:
   a third readout mode in which a potential that corresponds to the signal charge combined by the combining circuit is output to one column output line.

6. The image capturing apparatus according to claim 5, wherein the second readout mode is used when a generation amount of signal charges from the plurality of light receiving elements is low, and the third readout mode is used when in a case where the generation amount of the signal charges from the plurality of light receiving elements is high.

7. The image capturing apparatus according to claim 1, further comprising:
   an averaging circuit that averages the signals from the plurality of light receiving elements.

8. The image capturing apparatus according to claim 1, wherein the switching unit switches between the first readout mode and the second readout mode for each operation mode.

9. The image capturing apparatus according to claim 8, wherein the switching unit switches to the first readout mode in an operation mode for obtaining focus information of the imaging optical system, and switches to the second readout mode in an operation node for image capturing.

10. The image capturing apparatus according to claim 1, wherein the switching unit switches to the first readout mode for a row included in a focus detection region and switches to the second readout mode for a row not included in the focus detection region.

11. The image capturing apparatus according to claim 1, wherein two rows worth of signals of unit pixels are simultaneously read out in the second readout mode.

12. A control method of an image capturing apparatus that includes a unit pixel having a plurality of light receiving elements and a plurality of column output lines provided, for each column, at a number greater than or equal to at least a number of the light receiving elements of each unit pixel, the control method comprising:
   switching between a first readout mode for reading out signals from the plurality of light receiving elements via respectively different column output lines and a second readout mode for reading out signals from the plurality of light receiving elements via the same column output line for each unit pixel,
   wherein in the switching, readout mode is switched between the first readout mode and the second readout mode on a row-by-row basis in each region of one or more unit pixels.

13. A non-transitory computer-readable storage medium storing a program for causing a computer to execute a control method of an image capturing apparatus that includes a unit pixel having a plurality of light receiving elements and a plurality of column output lines provided, for each column, at a number greater than or equal to at least a number of the light receiving elements of each unit pixel, the control method comprising:
   switching between a first readout mode for reading out signals from the plurality of light receiving elements via respectively different column output lines and a second readout mode for reading out signals from the plurality of light receiving elements via the same column output line for each unit pixel,
   wherein in the switching, readout mode is switched between the first readout mode and the second readout mode on a row-by-row basis in each region of one or more unit pixels.

* * * * *